United States Patent [19]
Lamb, II

[11] 3,934,476
[45] *Jan. 27, 1976

[54] LINEAR TELETHERMOMETER

[76] Inventor: Harry H. Lamb, II, No. 3 Richards Drive, Dartmouth, Canada

[ * ] Notice: The portion of the term of this patent subsequent to Jan. 27, 1990, has been disclaimed.

[22] Filed: Sept. 11, 1969

[21] Appl. No.: 857,102

[52] U.S. Cl. ........ 73/362 AR; 73/362 SC; 307/310; 323/75 F; 323/75 H; 323/75 N
[51] Int. Cl.² ............................................ G01K 7/24
[58] Field of Search ............ 73/362, 362 R, 362 TS; 307/310; 323/75 F, 75 H, 75 N

[56] References Cited
UNITED STATES PATENTS

| | | | |
|---|---|---|---|
| 3,102,425 | 9/1963 | Westman et al. ................ | 73/362 SC |
| 3,316,765 | 5/1967 | Trolander et al. ............... | 73/362 TS |
| 3,430,077 | 2/1969 | Bargen .............................. | 307/310 |
| 3,440,883 | 4/1969 | Lightner ........................ | 307/310 X |

Primary Examiner—James J. Gill
Assistant Examiner—Frederick Shoon
Attorney, Agent, or Firm—George H. Riches & Associates

[57] ABSTRACT

A thermistor thermometer wherein one or more semiconductor diodes are electrically connected in series with the thermistor so that the exponent of the diode equation is proportional to the exponent of the thermistor equation and wherein a reference resistance in series with like number of identical diodes establishes a bridge circuit.

6 Claims, 5 Drawing Figures

LINEAR TELETHERMOMETER

This invention relates to a linear electronic temperature measuring device wherein the transducing element is a thermistor.

The previously known art consists of telethermometers which are non-linear, that is to say, which do not react proportionally to changes in temperature. The thermistor is, in itself, non-linear and therefore, the telethermometers, as presently known and used, are of necessity, non-linear. While it is possible to obtain linearity in the circuitry, this could only be accomplished by devising a more complex circuit which, it is apparent, would require more parts, more power, and which therefore, would be more expensive to manufacture and to sell.

While thermistor linearity may be achieved by increasing the complexity of the device, the cost is increased and the number of connections which have to be made to the device may also be increased. Various techniques using transistors and diodes as the transducing element have been developed, some exhibiting very good linearity over a wide temperature range. These devices are generally compromised by requiring three electrical connections for operation.

Accordingly, it is an object of this invention to achieve linearity in a novel telethermometer over a wide range of temperatures in a manner which is simple, efficient, and inexpensive.

It is a further object of this invention to provide a telethermometer using a small remote unit (the thermistor), which is linear over a wide range, which requires very little power, which is independent of nominal power supply variations, and which is insensitive to ambiant temperature variations.

Figure 1:
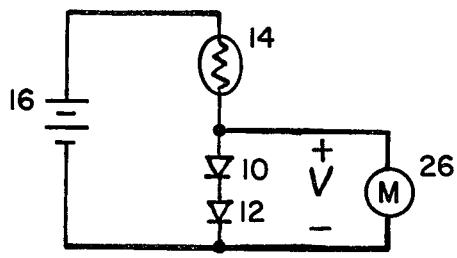
FIG. 1 is the basic divider circuit from which a nearly linear output may be obtained.

Generally speaking, thermistors have an exponential resistance characteristic with respect to temperature. Solid state diodes have a logarithmic voltage characteristic with respect to current. The characteristic of the diode may be used in opposition to the characteristic of the thermistor in order to obtain a voltage which is nearly linearly related to temperature as follows:

Referring to FIG. 1, a source of potential 16 is connected to the series combinations of a thermistor 14 and semiconductor diodes 10 and 12 such that the diodes are forward biased. The source of potential 16 is greater than twice the magnitude of the combined voltage knees of the diodes and the resistance of the thermistor 14 is sufficiently large over the desired range of temperature to avoid self-heating. The variation in the output voltage $v$, is small compared to the corresponding variation in diode current. Therefore, the value of diode current is controlled primarily by the resistance of the thermistor 14. Since the resistance of the thermistor 14 varies exponentially with temperature, the current through the diodes 10, 12, must also vary exponentially with temperature. However, the exponential variation of current through diodes 10, 12, corresponds to a linear variation of the voltage measured by voltmeter 26 across these same diodes.

Referring again to FIG. 1, where the resistance of the thermistor 14 is $$R_T = R_{T_o} e^{-\alpha (T-T_o)/T}$$

where $R_{T_o}$ = thermistor resistance at temperature $T_o$
$T$ = temperature
$\alpha$ = constant and the current through the diodes 10, 12, is $$i = \frac{E-v}{R_T} = I_o (e^{v/2\lambda v_o} -1)$$

where $E$ = battery 16
$v$ = output voltage
$\lambda$ = constant of the material
$\lambda v_o$ = diode thermal voltage
$I_o$ = reverse saturation current and $v_o = KT_a/q$, where K is Boltzman's constant, $q$ is electronic charge, and $T_a$ is ambiant temperature. For silicon diodes at low forward bias $\lambda \approx 2$ so that $$v = -4v_o \alpha T_o/T + 4v_o \left[\alpha + ln \left(\frac{E-v}{R_{T_o} I_o} + 1\right)\right].$$

Figure 2:
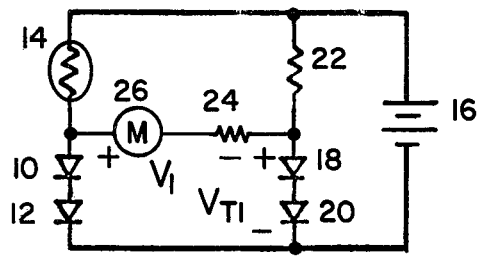
FIG. 2 is the basic bridge circuit which establishes a zero point and simplified the ambiant temperature sensitivity of the equations.

Now consider the bridge of FIG. 2, where $V_T$, the balancing voltage is, assuming all the diodes are identical, $$V_{T_1} = 4v_o \, ln \left(\frac{E-v_{T_1}}{R_{T_1} I_o} + 1\right)$$

where $R_{T_1}$ is the reference resistance 22. The output voltage of the bridge is $v_1 = v-v_{T_1}$. The output is $$v_1 = -4v_o \alpha T_o/T + 4v_o \left[\alpha + ln \left(\frac{E-v+R_{T_o} I_o}{E-v_{T_1}+R_{T_1} I_o} \cdot \frac{R_{T_1}}{R_{T_o}}\right)\right]$$

$$= -4v_o \alpha T_o/T + 4v_o \left[\alpha T_o/T_1 + ln \left(\frac{E-v+R_{T_o} I_o}{E-v_{T_1}+R_{T_1} I_o}\right)\right].$$

If E is sufficiently large the logarithmic term of $v_1$ may be neglected so that $$v_1 = 4v_o \alpha(T_o/T_1) = 4 \frac{k}{q} \alpha T_a \left(\frac{T_o}{T_1} - \frac{T_o}{T}\right)$$

Figure 3:
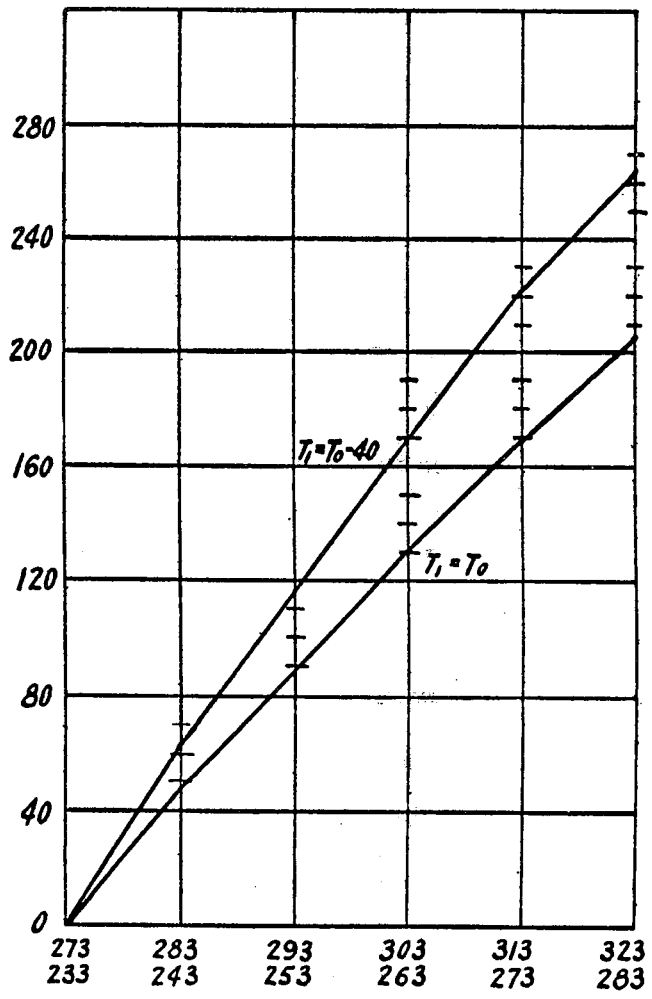
FIG. 3 is a graph of the output of the bridge for particular thermistor parameters.

FIG. 3, shows graphically the value of $v_1$ for $\alpha = 13.8$, $T_a = 298°K$ and $T_o \, 273°K$ for two values of $T_1$. As seen in the graph, an approximate linearity has been achieved over a relatively wide range of temperatures.

Thermal or voltage feedback may be applied to a portion of the reference resistance 22, to provide increased linearity.

Figure 4:
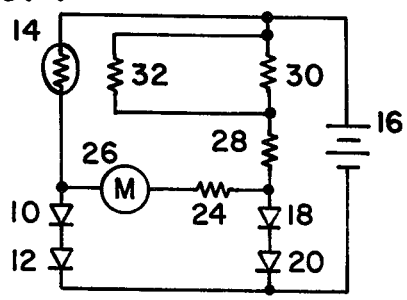
FIG. 4 is a bridge circuit which incorporates thermal feedback to improve linearity.

Thermal feedback is shown in FIG. 4 where the fixed resistance 22 is replaced by a temperature sensitive resistance consisting of a basic temperature sensitive resistance 32 connected in parallel with a fixed resistance 30 and in series with fixed resistance 23 which has a positive temperature coefficient and which is placed in proximity with thermistor 14.

Figure 5:
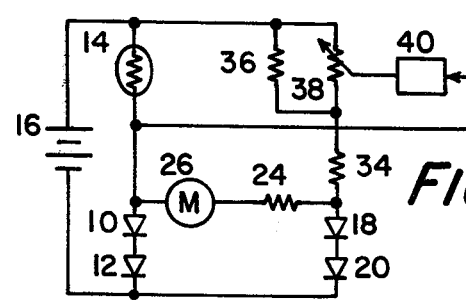
FIG. 5 is a bridge circuit which incorporates voltage feedback to improve linearity.

Voltage feedback is shown in FIG. 5 where the fixed resistance 22 is replaced by a voltage sensitive resistance consisting of a basic voltage sensitive resistance 38 connected in parallel with fixed resistance 36 and in series with fixed resistance 34 which is regulated by control circuitry 40 whose input is the voltage developed across diodes 10, 12 and whose output is such that the voltage variable resistance 38 increases as the measured temperature increases.

The simplicity of the basic circuit, the ease of calibration, the ease of establishing an indicator circuit and the simplicity of the ambient temperature effect make the method ideal for a wide variety of temperature sensing applications.

The sensitivity of the method is directly dependent upon the number of diodes used in each branch. The power supply voltage should be a minimum of about 1.4 volts/diode.

If a resistance 24, and current meter 26 resistance or equivalent, of the form $$R_b = R_1 + R_{T_a} = R_1 + R_{T_{ao}}[1+\beta(T_a-T_{ao})],$$

where $R_1$ is a fixed resistance, $R_{T_a}$ is a wire resistance with a positive temperature coefficient, $T_{ao}$ is the reference ambient temperature, $R_{T_{ao}}$ is the resistance of $R_{T_a}$ at the reference temperature, and $\beta$ is a constant of the material, is placed across the bridge, then by proper selection of $R_1$, $R_{T_{ao}}$ and $\beta$, the current through $R_b$ will be totally independent of ambient temperature. Since a current meter has an effective resistance (meter reading resistance), of the form $R_b - R_1$, an instrument with a meter read-out may be made independent of ambient temperature. This is very important to a mobile instrument which has to operate over a range of environments. This is also important to critical instruments such as clinical thermometers.

The method of this invention permits a wide variety of circuit designs to accommodate a wide variety of applications. The power requirements of the basic circuit may be made very small permitting small mobile instruments.

The foregoing specification sets forth an embodiment of my invention but as it is possible that others skilled in this art may devise various adaptations, modifications and variations thereof, I therefore claim as my invention any changes, modifications or adaptions of my invention which may fairly fall within the scope of the following claims.

I claim:

1. A nearly linear telethermometer device comprising a remote thermistor connected in series with one or more semiconductor diodes of any composition with a voltage-current relationship given by $$i = I_o(e^{v/n\lambda \cdot v_o}-1)$$

where $n$ is the number of diodes and being either discrete or integrated circuit devices, means for electrically connecting a biasing potential to said thermistor and diode(s) such that the diodes are forward biased, means for electrically connecting across said diode(s) device for measuring the voltage produced across said diode(s) which varies according to changes in the temperature of said thermistor.

2. A nearly linear telethermometer device comprising a remote thermistor connected in series with one or more semiconductor diodes of any composition with a voltage-current relationship given by $$i = I_o(e^{v/n\lambda \cdot v_o}-1)$$

where $i$ is the current through said diodes, $I_o$ is the reverse saturation current of said diodes, $v$ is the output voltage, $n$ is the number of diodes, and $2v_o$ is the diode thermal voltage, said diodes being either discrete or integrated circuit devices, resistance whose value is selected to be that of said thermistor at any desired reference temperature with said resistance connected in series with the same number of identical diodes as are connected in series with said thermistor, wherein said reference resistance and associated diodes are electrically connected in parallel with said thermistor and associated diodes, thereby forming a bridge circuit, means for connecting biasing potential to aforedescribed circuitry such that all diodes are forward biased, means for electrically connecting a device between the junction common to said thermistor and associated diodes and the junction common to said reference resistance and associated diodes for measuring the voltage produced by the aforedescribed bridge circuitry which varies according to the temperature of the said thermistor.

3. The nearly linear telethermometer device as described in claim 2, wherein increased linearity is obtained by means of thermal feedback to said reference resistance by making a portion of said reference resistance thermally sensitive with a positive temperature coefficient and placing that portion in proximity with the said thermistor.

4. The linear telethermometer device as described in claim 2 wherein the output voltage of the bridge is taken across an output resistance with a positive temperature coefficient of the form $$R_b = R_1 + R_{t_{ao}}(1+\beta(T_a-T_{ao}))$$

where $R_b$ is the value of said output resistance, $R_1$ is a fixed resistance, $T_a$ is the ambient temperature, $T_{ao}$ is a reference ambient temperature, and $\beta$ is a constant of the material from which said wire is formed, in order to develop an output current and related output voltage which are independent of the ambient temperature sensitivity of the semiconductor diodes.

5. The linear telethermometer as described in claim 2, wherein a portion of the output resistance is a current meter whose effective meter reading resistance contains the positive temperature coefficient.

6. The nearly linear telethermometer device as described in claim 2, wherein increased linearity is obtained by means of voltage feedback to said reference resistance by making a portion of said reference resistance voltage sensitive whereby that portion is regulated by a control circuit whose input is the voltage developed across those diodes which are connected in series with the said thermistor and whose output is such that the voltage sensitive resistance increases as the measured temperature increases.

* * * * *